United States Patent [19]

Vaughan

[11] Patent Number: 5,416,051
[45] Date of Patent: * May 16, 1995

[54] PILLARED METAKANDITE CLAY COMPOSITIONS AS SORBENTS, CATALYSTS AND CERAMIC AND REFRACTORY PRECURSORS

[75] Inventor: David E. W. Vaughan, Flemington, N.J.

[73] Assignee: Exxon Research & Engineering Co., Florham Park, N.J.

[*] Notice: The portion of the term of this patent subsequent to Jul. 5, 2011 has been disclaimed.

[21] Appl. No.: 985,992

[22] Filed: Dec. 4, 1992

Related U.S. Application Data

[63] Continuation of Ser. No. 857,033, Mar. 24, 1992, abandoned.

[51] Int. Cl.$^6$ ............................................. B01J 21/16
[52] U.S. Cl. ........................................... 502/84; 502/80
[58] Field of Search .................. 502/63, 68, 72, 73, 502/80, 84; 423/328.1, 328.2, 330, 331, 334, 710, 712

[56] References Cited

U.S. PATENT DOCUMENTS

| | | | |
|---|---|---|---|
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348.6 |
| 4,148,754 | 4/1979 | Strobel et al. | 252/429 C |
| 4,173,547 | 11/1979 | Graff | 252/429 B |
| 4,176,090 | 11/1979 | Vaughan et al. | 252/455 Z |
| 4,302,566 | 11/1981 | Karol et al. | 526/125 |
| 4,335,016 | 6/1982 | Dombro | 252/429 B |
| 4,374,753 | 2/1983 | Pullukat et al. | 252/429 B |
| 4,378,304 | 3/1983 | Dombro | 252/429 B |
| 4,458,058 | 7/1984 | Dombro | 526/129 |
| 4,481,301 | 11/1984 | Nowlin et al. | 502/104 |
| 4,637,992 | 1/1987 | Lewis et al. | 502/84 |
| 5,112,782 | 5/1992 | Brown et al. | 423/710 |
| 5,310,715 | 9/1994 | Kresge et al. | 423/328.2 |
| 5,326,734 | 7/1994 | Vaughan | 502/84 |

FOREIGN PATENT DOCUMENTS 0306939  3/1989  European Pat. Off. .

*Primary Examiner*—Asok Pal
*Assistant Examiner*—Bekir L. Yildirim
*Attorney, Agent, or Firm*—Ronald D. Hantman

[57] ABSTRACT

This present invention includes a composition of matter made up of a kandite clay which has been treated with large molecules containing multi-atom metallic or semi-metallic species and heated to produce pillars within the clay which are located generally between the clay's layers. The pillared kandite composition is useful as a catalyst support, sorbent, or ion exchanger.

The present invention also includes a process for producing the pillared kandite composition comprises mixing the finely divided clay in an aqueous solution with the pillaring medium and heating the resulting composition at a temperature high enough to decompose the added compound.

34 Claims, 1 Drawing Sheet

PILLARED METAKANDITE CLAY COMPOSITIONS AS SORBENTS, CATALYSTS AND CERAMIC AND REFRACTORY PRECURSORS

This is a continuation of application Ser. No. 857,033, filed Mar. 24, 1992, abandoned.

FIELD OF THE INVENTION

On calcining kandite clays they irreversibly dehydroxylate and loose their long range ordered layer structures. Calcined kaolin, known in the art as metakaolin, is such a material having extensive industrial usage. If contacted with solutions containing multiatomic metallic or semi-metallic clusters, novel pillared layer like materials can be synthesized which have the high stability and porosity characteristics of useful supports for catalysts and as sorbents. The newly derived chemical manipulability of this refractory precursor makes such products useful in the preparation of high stability ceramics, refractories, insulation materials and lightweight building products.

BACKGROUND OF THE INVENTION

The term "clay", as used in various areas of technology, is subject to wide variations in meaning. However, an inclusive definition normally would be a naturally occurring sedimentary material generally composed of hydrated silicates of aluminum, iron or magnesium and often containing hydrated alumina and iron impurities. The particles of a clay are typically of at least near-colloidal size in at least one dimension (platelets are typical) and commonly develop thixotropic flow properties when sufficiently pulverized and wetted.

The organization of clay types remained somewhat poor until the development of satisfactory x-ray techniques for studying the atomic structure of individual clays. A paper: *Kaolin Materials*, U.S. Geological Survey Professional Paper 165-E, C. S. Ross and P. F. Kerr, 1930, pp. 151 to 176, is widely recognized as the beginning of a systematic approach to clay mineralogy. The monograph "Crystal Structures of Clay Minerals and their x-ray Identification", edited by G. W. Brindley and G. Brown for the Mineralogical Society, is the most convenient standard reference. More recent work has been reviewed in a Mineralogical Society of American Monograph (Reviews in Mineralogy, Vol 16, "Hydrous Phyllosilicates, Ed S. W. Bailey, (1988)).

Included in the classes of clay minerals are smectite clays and kandite clays, the latter synonymously called diazeolites, serpentines, septochlorites and a variety of other specific names, depending on composition and layer orientation.

Smectites generally layered clays represented by the general formula:

$$(Si_8)^{iv}(Al_4)^{vi}O_{20}(OH_4)$$

where the IV designation indicates an ion coordinated to four other ions, and VI designates an ion coordinated to six other ions. The IV coordinated ion is commonly $Si^{4+}$, $Al^{3+}$, or $Fe^{3+}$ but could also include several other four coordinated ions, e.g., $P^{5+}$, $B^{3+}$, $Ge^{4+}$, $Be^{2+}$, etc. The VI coordinated ion is typically $Al^{3+}$ or $Mg^{2+}$, but could also include many other possible hexacoordinate ions, e.g., $Fe^{3+}$, $Fe^{2+}$, $Ni^{2+}$, $Co^{2+}$, $Li^+$, etc. The charge deficiencies created by substitutions into these cation positions are balanced by one or more cations located between the structured platelets. Water may be occluded between the layers and either bonded to the structure itself or to the cations as a hydration shell. Commercially available clays typical of this class include variants of montmorillonite, bentonite, and hectorite. The pillaring of said materials is well established and characterized (e.g., U.S. Pat. Nos. 4,176,090; 4,248,739; and 4,271,043) and the state of the art has recently been reviewed by Vaughan (Amer. Chem. Soc. Symp. Ser. #368, p. 308-323, (1988)), particularly as the basic concept has been applied to layer compounds other than clays.

Kandite clays, also often called "kaolinite" minerals, are made up of 1:1 layers of tetrahedrally oxygen coordinated silicon, bonded to layers of octahedrally bound cations. In kaolinite, dickite and nacrite all of the tetrahedral cations are $Si^{4+}$ and all of the octahedral cations are $Al^{3+}$ (so called dioctahedral forms). However, in the serpintinite varieties, major substitution of $Al^{3+}$ and $Fe^{3+}$ occurs for $Si^{4+}$ in the tetrahedral layer and a range of di-and trivalent cations substitutes for $Al^{3+}$ in the octahedral layer. The ion $Mg^{2+}$ is typically substituted for $Al^{3+}$, although any of the Fourth Period Transition elements, e.g., V, Cr, Mn, Fe, Co, Ni, Cu, Zn, may serve as substitutes. In some locations they may form major deposits, as in the case of garnierite, a major nickel ore. A main characteristic of the class is that each member generally has a 1:1 neutral layer. The ideal stoichiometry of the dioctahedral (kaolinite) and trioctahedral (chrysotile) end-members may be given respectively as:

$$Al_2Si_2O_5(OH)_4$$

and $$Mg_3Si_2O_5(OH)_4$$

Mixed layers are common, as they are in all clay mineral types. However, Kaolin is quite unique as a mineral in that it exists in very high purity deposits in many parts of the world. The deposits in the states of Georgia and North and South Carolinas are particularly famous. The single layer thickness of this repeating sheet is about 7.2 Å. When layers of water separate the 1:1 sheets, the intersheet dimension expands to about 10.1 Å, as is seen in the halloysite variety of kaolinite. Halloysite in comparison is a relatively rare mineral in large deposits and rapidly loses water on exposure to air.

Sorption of various organic molecules, such as glycerol, have been reported for kaolinite and the 2:1 smectite clays. Organic molecules do not as a rule produce permanent pillaring between the clay layers, but form intercalates which may exhibit molecular sieve properties in some cases, as described by R. M. Barrer (Clays and Clay Minerals, v. 37, p. 385-95 (1989)) and Theng ("Formation and Properties of Clay Polymer Complexes, Elsevier Press" (1979)), but readily lose such properties on heating to moderate temperatures. Similarly, intercalation of organic salts, e.g., potassium acetate, has been reported and are reviewed by MacEwan and Wilson (ibid, p. 236) and Barrer (*Zeolites and Clay Minerals* p. 407, 1978). Permanent pillaring has not been reported in 1:1 kandite materials hitherto, and is the principal focus of a related invention (see copending patent application C-2441).

Recently several new layer structures have been successfully pillared with a variety of anionic, cationic and neutral inorganic polymeric molecules. They include various clays such as rectorite (European Patent Appln. 197,012) and tetrasilicia mica (Japanese Patent 56-142982); sheet silicic acids (European Patent Appln. 222,597; Deng et al, Chemistry of Materials, v. 1, p. 640–50, (1989)) which comprise a very large group of material (see F. Liebau for a review of such materials in "Structural Chemistry of Silicates" (Springer-Verlag (1985)); and zirconium phosphates (European Patent Appln. 159,756).

Several recent reviews of pillaring in clays and related sheet structures (Pinnavia, Science, 220, p. 365, (1983); Vaughan, "Catalysis Today", ibid 1988; Vaughan, in "Perspectives in Molecular Sieve Science", Ed. W. H. Flank et al, ACS Symp. Ser. 368, p. 308–23 (1988)) do not report kandite pillaring. Based on the viewpoint that pillaring requires either a change deficiency on the layer, or high sheet hydroxyl concentrations, the kandites would not be expected to be suitable pillaring substrates, as they are not recognized as having significant layer charge, and therefore have no ion exchange capacity. Reactivity and exchange in these materials is generally related to 'OH' groups at the edges of the crystals. I have recently discovered that these can indeed be pillared using various methods to form porous materials (copending patent application C-2441).

Metakaolin is an ill defined material derived from kaolin by calcination at a temperature over about 550° C. to dehydroxylate the sheet structure. Analogous kandites of other compositions undergo similar dehydroxylation. The precise temperature at which this transformation from ordered structure to disordered form depends to some degree on the chemistry and crystallinity of the particular kandite, in addition to the specific calcination conditions used, such as kind of atmosphere, partial water vapor pressure and rate of heating. The nature of these disordered materials, particularly metakaolin, has been reviewed by Grim (in "Clay Mineralogy", McGraw Hill (New York), p. 299–313 (1968)) and Hang and Brindley examined the changes in garnierite in detail (Clays and Clay Minerals, v. 24, p. 51 (1973)). More recently the general subject was reviewed by Brindley and Lamaitre (in "Chemistry of clays and clay minerals", Ed A. C. D. Newman, Min. Soc. (London) Monogr. 6, Ch. 7 (1987)). More detailed elucidation of these structures can be obtained from the recent application of $^{27}Al$ and $^{29}Si$-MASNMR techniques (e.g., Fitzgerald et al, Solid State Ionics, v. 32, p. 378 (1989)). As even rehydration of metakaolin is difficult and only occurs in mildly treated forms, pillaring of these materials would be expected to be an unlikely process. I have discovered that, by carrying out the reaction in such a manner as to separate the disordered sheets, possibly by generating a charge deficiency in the metakandite by partial pre-leaching of the disordered solid, these materials can indeed be pillared and an ordered or partially ordered structure regenerated which has significant microporosity. The products of this invention are not limited to modified metakaolin, but include all "metakandite" compositions (i.e., those materials derived by dehydroxylation of kandites, and which have, in an X-ray sense, a disordered or random structure). A partial list of such subject kandites, for purposes of illustration, is given in Table 1.

TABLE 1

EXAMPLES OF KANDITE MINERALS
KAOLINS - SERPENTINES

| | VI | IV | $O_5(OH)_4$ |
|---|---|---|---|
| Kaolin | $Al_2$ | $Si_2$ | |
| Halloysite | $Al_2$ | $Si_2$ | |
| Chrysotile | $Mg_3$ | $Si_2$ | |
| Garnierite | $Ni_3$ | $Si_2$ | |
| Amesite | $(Mg, Fe)_2Al$ | Si Al | |
| Cronstedtite | $(R_{3-x}{}^{2+}, Fe_x{}^{2+})$ | Si, $Fe^{3+}$ | |
| Greenalite | $(Fe, Mg, Mn)_3$ | $Si_2$ | |

SUMMARY OF THE INVENTION

The present invention includes pillared interlayered meta-kandites which comprise meta-kandite layers permanently spaced with inorganic metal or metal oxide "pillars" derived from charged or neutral metal oxo-, hydroxy or organo-metallic clusters comprising more at least four metal atoms. Such products show very broad basal reflections (usually the 001 and occasionally the 002) of at least 10 Å, representing an interlayer pillar size or void space of at least 4 Å, but show no hk diffraction reflections. PILK's may be used as sorbents, catalysts, catalyst supports or matrices, extenders, fillers and ceramic precursors. The present invention also includes a method for making these compositions.

DESCRIPTION OF THE PREFERRED EMBODIMENTS

Figure 1:
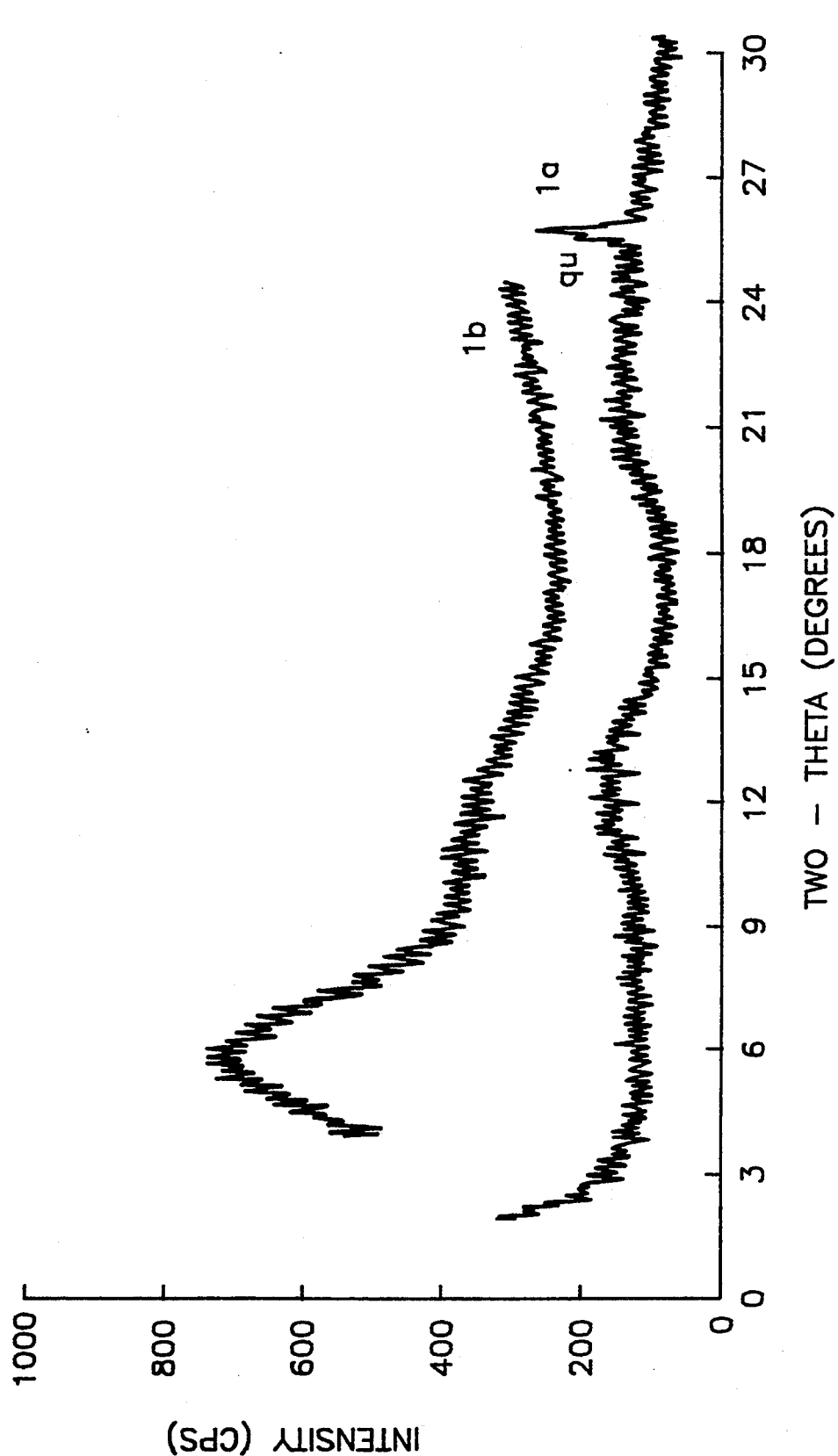
FIG. 1 compares the "amorphous" metakaolin with its pillared, structured form.

As mentioned above, the materials used as raw materials in the inventive process are calcined and dehydroxylated kandite-type clays. Those clays are generally made up of 1:1 layers of tetrahedrally oxygen coordinated silicon bonded to layers of octahedrally bound cations. In kaolinite, dickite and nacrite, all of the tetrahedrally cations are $Si^{4+}$ and all of the octahedral cations are $Al^{3+}$. A schematic representation of the hydrated kaolinite ($Al_2Si_2O_5(OH)_4$) structure is shown in FIG. 1a. The interlayer distance for kaolinite and analogous kandites is about 7.2 Å.

Clays have small substitutions of $Al^{3+}$, $Fe^{3+}$ and other possible tetrahedral substituents for $Si^{4+}$ in the tetrahedral layer; and a variety of di- and trivalent cations for the $Al^{3+}$ in the octahedral layer. The metal $Mg^{2+}$ is the usual substituent for $Al^{3+}$ although many of the Fourth Period Transition elements may act as that substituent in addition to $Mg^{2+}$ and $Li^+$ and there is a major literature base for such synthetic materials and their use as catalysts (e.g., U.S. Pat. Nos. 3,875,288; 3,976,744 and 4,033,858). The extensive literature on earlier synthetic clay work, including kandite synthesis, has been reviewed by Eitel (Silicate Science, vol. 4, "Hydrothermal Silicate Systems", Academic Press (1966)). A main characteristic of the kandite class lies in the fact that each member has a 1:1 neutral or near neutral layer separated by water molecules in some hydrated forms (e.g., as in halloysite). Typical commercially available clays include kaolinite, halloysite, and various fibrous, platy or prizmatic like chrysolites and serpentines, examples of which are listed in Table 1. However, numerous methods are known for the synthesis of various kandites, and such synthetic analogues are particularly advantageous for the objectives of this invention, in that they have high chemical purity and often very small crystal sizes.

A variety of metal complexes, particularly those containing atoms of the 3rd, 4th, 5th, and 6th periods of the Periodic Table (desirably Groups III-B, IV-B, V-B, VI-B, VII, and Mg, Al, Si, Zn, Ga and Ge), may be used in inorganic or organometallic cluster ions or molecules. The formation of stable pillars takes place by heating the clay infused with the pillaring medium in an oxidizing, reducing or neutral atmosphere at temperatures generally below about 300° C. to about 700° C. The resulting pillars may be, depending upon the pillaring medium and heating conditions chosen (temperature pressure and the gas present), either in the form of a metal oxide, metal sulfide, or reduced metal clusters, depending on whether the heating is carried out in a oxidizing (air, $O_2$), sulfiding ($H_2S$) or reducing ($H_2$, $CH_4$), atmosphere.

The invention includes a variation of the solution technique for infusing pillaring medium into clays having a water layer (halloysite) or no water layer (kaolinite). Preliminarily variations may separate the dehydroxylated sheets to later inclusion of the large molecule pillaring medium by first opening the layers with small salt molecules, e.g., aqueous potassium acetate, $NH_4F$-DMSO solutions, etc., or non-pillaring but expanding solvents, e.g., DMSO, alcohols, glycerol, dimethyl sulfoxide, etc. The preliminary step is followed by introduction of the pillaring medium, followed by vacuum or controlled atmosphere heat treatments, which may include spray drying. This initial intercalation may be accompanied by layer reaction (e.g., $Al^{3+}$ leaching by $NH_4F$, EDTA, etc.).

It is recognized that the metakandite materials, whether they be natural minerals or synthetic materials, are dehydroxylated and have lost some or all of their structural long range crystallographic order between 500° C. and 600° C., after the major loss of interstitial and surface water at about 80° C.–170° C. However, this loss of crystallographic order does not, in the case of pillared materials, mean that the high microporosity of the system is also lost.

In any system of fine crystal sheet particles and polymer clusters a mesoporosity will be developed characteristic of random flocculation of sheet with sheet, and sheet with polymer. This is an integral and essential property of the system well known in the art. It is the necessary development of a regular and ordered microporosity superimposed on this mesoporosity that is one of the essential parts of the invention. Such a microporosity, shown as pores less than about 30 Å in conventional pore size distribution analyses, will usually constitute at least 35% of the pore volume or equivalent nitrogen surface area of the pillared metakandite. The mesoporosity may be maximized by using synthetic colloidal crystal forms of kandite as the raw material for the purposes of this invention.

The intimate mixing of cluster and sheet—a near molecular association—is a necessary precondition for the synthesis of numerous "high tech" ceramics. The raw materials base for these often exclude clays, a low cost source of $SiO_2$ and $Al_2O_3$, because it is not possible to attain this necessary high level of mixing for the synthesis of high density, controlled composition ceramic products. This new ability to operate such highly mixed compositions through intercalation and initial pillaring, creates a new and novel family of ceramic precursors.

The present invention includes both compositions of matter, pillared metakandite products, and processes for producing those compositions.

The method for pillaring metakandite clays include solution or vapor phase intercalation of a pillaring medium made up of a salt pair or neutral molecule between the 1:1 layers of the mineral. One component of the pillaring medium must be a larger multi-atom complex such that even after decomposition of the pillaring medium within the clay, the clay layers have a separation of 4 Å or more. Typical generic species include aluminum chlorhydrol $Al_{13}O_4(OH)_{24}Cl_7$ (large cation, small anion) silico-tungstic acid, $H_4SiW_{12}O_{40}$ (large anion, small cation), zirconyl oxychloride complexes in addition to any one or more of the many homopoly or heteropolymetallate complexes.

The pillaring medium used in the practice of the present invention may be either a salt pair or a neutral molecule but generically must include a large multi-atom complex which produces, after the heating step disclosed below, some stable pillars between the clay layers. Generally any decomposable pillaring medium, particularly those containing atoms of the 3rd, 4th, 5th and 6th periods of the Periodic able and more desirably those from Groups IB, IIB, IV-B, V-B, VI-B, VII-B, VIII as well as Mg, Al, and Si in those periods, are acceptable. The group of metals generally known as refractory metals are especially suitable. Examples of the generic inorganic class include aluminum chlorhydrol ($Al_3O_4(OH)_{24}Cl_7$) and substituted derivatives, organic derivatives of the metals and semimetals listed above (e.g., tetramethylammonium (TMA) silicate $((TMA)_8Si_8O_{20})$), and the many hetero polymetallate clusters represented by the formula:

$$A_a[L_lM_mJ_rO_y]dH_2O$$

wherein

A is an ion selected from the group consisting of hydrogen; one or more of the Group I-A to VI-A or I-B to VI-B metals; one or more of the rare earth metals; ammonium, alkyl ammonium, alkyl phosphonium or alkyl arsonium; or a mixture of two or more thereof;

M is Zn, Al, Ga, Ge, Ti, Cr, Mn, Fe, Co, B, Ni, Rh, Zr or a mixture of two or more thereof;

L is P, As, Si, Al, H or a mixture of two or more thereof;

J is Mo, W, V, Nb or a mixture of two or more thereof;

a is a number which when multiplied by the valence of A will result in balancing the charge on the complex within the brackets;

l is a number ranging from zero to about 20, preferably from zero to about 2;

m is a number ranging from zero to about 20, preferably from zero to about 6;

r is a number ranging from about 1 to about 50, preferably from about 6 to about 12;

y is a number ranging from about 7 to about 150, preferably from about 24 to about 40; and d is a number ranging from zero to about 150, preferably from about 6 to about 75;

A is preferably H, Na, K, $NH_4$, F, Cl, Br, I, $CH_3COO$ or a mixture thereof.

M is preferably Ni, Mn, Zn, Ti, Co or Cr.

L is preferably H or P.

J is preferably Mo or W.

The alkyl groups on the alkyl ammonium, alkyl phosphonium and alkyl arsonium can each have up to about 6 carbon atoms. The alkyl ammonium, alkyl phosphonium and alkyl arsonium compounds can be mono-, di-, tri- or tetra-alkyl compounds. When more than one alkyl group is present, they can be the same or different.

In various embodiments L is H; M is Al, Mn, Fe, Co, Ni, Zn, Zr, Ga or Rh; J is Mo; l is 6, z is 6, y is 24 and m is 1; or in another embodiment L is H, l is 6; J is W; z is 6; y is 24; M is Ni; and m is 1; or another embodiment l is zero; J is W; z is 6; y is 24; M is Mn or Ni; and m is 1. In other embodiments l is zero; J is W; z is 11; y is 39; M is B, Ga, Fe, Co or Zn; and m is 1; l is zero; J is W; z is 12; y is 40; M is B, Ga, Ge, Cr, Mn, Fe, Co or Zn; and m is 1. In still configurations l is zero; J is Mo; z is 12; y is 40; M is Ge, Zr or Ti; and m is 1; l is zero; J is Mo; z is 9; y is 32; M is Mn or Ni; and m is 1; l is zero; J is Mo; z is 10; y is 36; M is Co; and m is 2; A is Cl, M is Zr and M is a multiple of 4.

An especially suitable process for pillaring the metakandites includes the steps of first finely dividing and dispersing the calcined clays in water to produce a thin slurry. This slurry may be allowed to stand to settle out non-dispersed clay solids and impurity components such as quartz. The upper layer containing dispersed calcined clay is then separated to yield a precursor suspension of small particles. The suspension is then intimately mixed with an appropriate amount of an aqueous, preferably acidic, solution of the pillaring medium. This mixing may take place in any reaction vessel or mixing equipment. The mixed suspension is then desirably heated to enhance the reaction and permeation rates of the pillaring medium into the calcined clay particles. Temperatures below about 200° C. are generally acceptable. Obviously the reaction vessel must be capable of withstanding the autogeneous pressure resulting from the reaction step. In the reaction of metakaolin itself, temperatures above about 50° C. and less than 100° C. are particularly effective.

After pillaring, the reaction product is then calcined in an oxidizing, reducing or inert atmosphere. If the pillared interlayered metakandite is to be used as a catalyst support, an oxidizing atmosphere may be most desirable in that the metals or semimetals in the pillaring medium will end up as oxides in the pillars, e.g., tungsten oxide, silica, alumina, titania, zirconia, thoria, etc. If, on the other hand, catalytic properties from metals are expected of the pillars, a reducing atmosphere containing hydrogen, carbon monoxide, or other known reducing gas is desirable. If the product is to be used in hydrotreating reactions it may be desirable to calcine the precursor form in a sulfiding gas such as hydrogen sulfide.

The catalytic and absorbent characteristics of the pillared interlayered metakandite products of the present invention may be modified with a wide range of compounds including salts of ammonium and metals of Groups I-B through VIII of the Periodic Table. Impregnation of these salts is the preferred mode of inclusion. These materials have high useful micropore volume, derived from the pillar-metakaolin, or pillar mullitized metakaolin, quasi-sheet structure. Metakaolin itself has a low surface area, typically less than 5 m$^2$/gm, and often less than 1 m$^2$/gm. The procedures of this invention frequently increase the surface areas of the subject kandites by at least a factor of ten, and frequently a factor greater than twenty.

The heat treated pillared metakandites of the invention have an interlayer spacing greater than the original non-calcined clay, and usually greater than about 10 Å (i. e., have micropores greater than about 5 Å).

These pillared metakandites are useful as adsorbents and catalytic supports. They can be combined with other catalytic components such as silica, alumina, silica-alumina, natural or synthetic zeolites, various oxides and other clays. They are particularly useful as molecular sieve absorbents and as catalyst supports and matrices, as actual catalysts, or as substrates for metal cluster catalysts.

Metakaolin itself is widely used as a low cost filter, extender and coating material in a wide variety of applications. These pillared materials may significantly improve and extend such applications.

Similarly metakaolin is used as a raw material in the manufacture of ceramics and refractories. The methods of this invention provide a mechanism for ready control and manipulation of various compositions of novel materials based on metakaolin.

Having described the basic and broad aspects of the invention, the following specific examples are given to illustrate preferred embodiments and are not offered to limit, in any way, the scope of the invention.

EXAMPLE 1

A sample of Nusheen kaolin (Freeport Kaolin Co.) was converted to metakaolin by calcining in a muffle furnace for three hours at a temperature of 750° C. The X-ray diffraction pattern showed it to be amorphous except for a minor quartz impurity at about 26.5° 2Θ (qu) (FIG. 1a). 10 gm were slurried in 40 gm water together with 60 gm ZAA zirconia solution (20% $ZrOCl_2$ acetic acid solution, Magnesium Electron Co. PLC). After thorough mixing the reactants were placed in a Teflon (DuPont Co.) jar and heated at 100° C. for one hour, at which time the sample had completely gelled. 40 gm water were added, the sample rehomogenised, and heated again at 100° C. for a further two days. The sample was then filtered on a vacuum filter, washed, and air dried at room temperature. The X-ray diffraction pattern of this material showed broad peaks at about 6° and 12° 2Θ (FIG. 1b), indicating a disordered but nonetheless a somewhat regular layer spacing larger than that of the original kaolin, approximating a 5 Å micropore. This material was calcined at 450° C. for two hours, at which point it had lost 39.4 wt % ($H_2O$ and included acid). It was then rehydrated in a hydrator at 56% relative humidity (RH) overnight. The sample sorbed 6.9 wt % water. After a similar treatment at 600° C. and rehydration for three days at 54% RH the material sorbed 7.5 wt % water. A sample of metakaolin itself, similarly treated, sorbed less than 0.2 wt % water.

EXAMPLE 2

A sample of Hydrite UF kaolin (Georgia Kaolin Co.) having high purity and a median particle size of 0.2 microns was calcined for three hours at 750° C. to convert it to amorphous meta-kaolin. 5 gm of this meta-kaolin were slurried in 25 gm deionized water and 15 gm of ZAA zirconium acetate solution containing about 20% $ZrO_2$ (Magnesium Electron Co., New Jersey) were mixed in with stirring. The slurry was placed in a 125 ml Teflon (DuPont Co.) jar and heated at 100° C. After three hours the sample was a solid mass. It was heated for a further 27 hours then air dried at 28° C. and analyzed by X-ray diffraction. The formerly amorphous material now showed strong broad X-ray diffraction (Cu K-alpha) peak at 15 Å and a weaker band at about 7 Å, clearly demonstrating a reordering and pillaring of the formerly disordered meta-kaolin, indicating an 8 Å gallery between the layers. The material was calcined at 450° C. for two hours then equilibrated with water in an 88% relative humidity hydrator (over a saturated solution of $BaCl_2$. A one hour exposure resulted in a weight gain of 5.3%, after 90 minutes 8.5 wt % and after 16 hours 13.6 wt %. Untreated meta-kaolin would have almost no weight gain under the same conditions.

EXAMPLE 3

A sample of Hydrite UF kaolin (Georgia Kaolin Co.) having high purity and a median particle size of 0.2 microns was calcined for three hours at 750° C. to convert it to amorphous meta-kaolin. 5 gm of this meta-kaolin were slurried in 25 gm deionized water and 20 gm of an aluminum "chlorhydrol" solution containing about 50% of polymers approximating $[Al_{13}]^{7+}$ (Reheis Chemical Co., New Jersey) were mixed in with stirring. The slurry was placed in a 125 ml Teflon (DuPont Co.) jar and heated at 100° C. for 30 hours, then air dried at 28° C. and analyzed by X-ray diffraction. The formerly amorphous material now showed broad X-ray diffraction bands (Cu K-alpha) centered at about 15 to 16 Å and about 7 Å, demonstrating a partial reordering of the formerly disordered meta-kaolin, and indicating an approximately 8 Å gallery between the layers. The material was calcined at 450° C. for 2 hours then equilibrated with water in an 88% relative humidity hydrator (over a saturated solution of $BaCl_2$ for 16 hours, resulting in a weight gain of 7.4%. Untreated meta-kaolin would have almost no weight gain under the same conditions.

What is claimed is:

1. A microporous pillared metakandite clay composition which includes separated layers wherein the interlayer distances are substantially greater than a precursor of the same but non-separated derivative clay and wherein the composition includes pillars derived from a solution of specific molecular or ionic cluster compounds selected from the group consisting of an inorganic oxide, sulfide, metal cluster and combinations thereof which separates and cross-links (pillars) said layers, wherein said pillars have definite chemical composition and which on calcination permanently pillars and separates said layers.

2. The composition of claim 1 wherein the meta-kandite clay composition comprises metakaolinite.

3. The composition of claim 1 wherein the kandite clay composition comprises calcined halloysite.

4. The composition of claim 1 wherein the metakandite clay composition is derived from a mineral form.

5. The composition of claim 1 wherein the metakandite clay composition is derived from a synthetic form.

6. The composition of claim 1 wherein the inorganic oxide is at least one selected from the oxides of elements in the 3rd, 4th, 5th, or 6th period of the Periodic Table.

7. The composition of claim 1 calcined to give a material having micropores of diameter less than 30 Å.

8. The composition of claim 6 wherein the inorganic oxide is selected from at least one of the group consisting of oxides of elements in the III-B, IV-B, and VI-B Groups of the Periodic Table.

9. The composition of claim 6 wherein the inorganic oxides are selected from at least one of the group consisting of alumina, silica, titania, and zirconia.

10. The composition of claim 6 wherein the inorganic oxide is zirconia.

11. The composition of claim 6 wherein the inorganic oxide comprises a mixture of phosphorus and molybdenum oxides.

12. The composition of claim 1 wherein at least a portion of any exchangeable cations in said composition are exchanged with cations selected from the group consisting of hydrogen, ammonium, Groups I-B to VII-B members of the Periodic Table and mixtures thereof.

13. A process for producing pillared metakandite clay compositions which includes separated layers wherein the interlayer distances are substantially greater than a precursor of the same but non-separated clay and wherein the composition includes pillars derived from molecular or ionic compounds selected from the group consisting of an inorganic oxide, sulfide, metal cluster and combinations thereof which separates said layers, comprising the steps of:

i) intimately mixing an amount of a finely divided metakandite clay precursor with a solution comprising water to produce a precursor suspension slurry;

ii) adding an effective amount of pillaring medium to said precursor suspension and maintaining said mixture for a period of time sufficient to allow infusion of the pillaring medium into the clay precursor;

iii) heating the metakandite clay precursor containing the pillaring medium at a temperature sufficient to decompose the pillaring medium to an inorganic pillar separating layers of the precursor and therefore produce the pillared metakandite clay composition.

14. The process of claim 13 in which the pillaring medium includes clusters having at least four metal atoms.

15. The process of claim 13 wherein the mixture of clay precursor suspension and pillaring medium are maintained at an elevated temperature above room temperature during infusion of the pillaring medium in step ii.

16. The process of claim 15 wherein said elevated temperature is between room temperature and about 200° C.

17. The process of claim 15 wherein said elevated temperature is between room temperature and about 500° C.

18. The process of claim 13 is which the metakandite slurry in step ii is first adjusted to a pH between 2 and 5 prior to contacting with the pillaring species.

19. The process of claim 13 wherein the step iii of heating the metakandite clay precursor infused with the pillaring medium to decompose the pillaring medium takes place in an oxidizing atmosphere.

20. The process of claim 13 wherein the step iii of heating the metakandite clay precursor infused with the pillaring medium to decompose the pillaring medium takes place in a reducing atmosphere.

21. The process of claim 13 wherein the step iii of heating the metakandite clay precursor infused with the pillaring medium to decompose the pillaring medium takes place in a sulfiding atmosphere.

22. The process of claim 13 wherein the step iii of heating the metakandite claim precursor infused with the pillaring medium to decompose the pillaring medium takes place in an inert atmosphere.

23. The process of claim 13 wherein the metakandite precursor is selected from the group consisting of calcined kaolinite, halloysite, nacrite, or dickite.

24. The process of claim 13 wherein the pillaring medium is selected so as to produce a decomposed pillaring medium selected from the oxides of elements in the 3rd, 4th, 5th or 6th periods of the Periodic Table.

25. The process of claim 23 wherein the pillaring medium is additionally selected to produce a decomposed pillaring medium selected from the group consisting of the oxides of elements in the III-B, IV-B, V-B, and VI-B Groups of the Periodic Table.

26. The process of claim 13 wherein the pillaring medium is selected to produce a decomposed pillaring medium comprising at least one oxide selected from the group consisting of magnesia, alumina and silica.

27. The process of claim 13 wherein the pillaring medium is selected to produce a decomposed pillaring medium comprising a mixture of phosphorus and molybdenum oxides.

28. The process of claim 13 additionally comprising the steps of exchanging at least a portion of any exchangeable cations in said metakandite clay products with cations selected from the group consisting of hydrogen, ammonium, Group IB-to VIII members of the Periodic Table and mixtures thereof.

29. The process of claim 13 additionally comprising the step of adding an effective amount of an expanding non-pillaring medium to the precursor suspension prior to adding the pillaring suspension so as to expand the interlayer distance between clay layers.

30. The process of claim 28 wherein the expanding non-pillaring medium is selected from the group consisting of salt molecules and polar organic solvents.

31. The process of claim 29 wherein the expanding non-pillaring medium is a salt molecular selected from the group consisting of potassium acetate and a mixture of $NH_4F$-DMSO.

32. The process of claim 29 wherein the expanding non-pillaring medium is selected from the group consisting of $C_1$ to $C_4$ alcohols and glycerol.

33. The metakandite composition of claim 1 in which the pillaring medium is one or more of composition comprising silica, alumina, zirconia, titania, magnesia or phosphorous oxide and meta-kandite is meta-kaolin which is further combined with a zeolite which zeolite is a faujasite polymorph or intergrowth.

34. The composition of claim 1 suitably admixed with between 20 wt % and 90 wt % of a microporous crystalline zeolite, silica, aluminophosphate or metal aluminophosphate phase for use as a sorbent or catalyst.

* * * * *